United States Patent [19]

Erdmannsdörfer

[11] Patent Number: 4,619,674
[45] Date of Patent: Oct. 28, 1986

[54] DUAL-ELEMENT FILTER CARTRIDGE FOR AIR INTAKE FILTERS DESIGNED FOR A DUSTY ENVIRONMENT

[75] Inventor: Hans Erdmannsdörfer, Ludwigsburg, Fed. Rep. of Germany

[73] Assignee: Filterwerk Mann & Hummel GmbH, Ludwigsburg, Fed. Rep. of Germany

[21] Appl. No.: 775,881

[22] Filed: Sep. 13, 1985

[30] Foreign Application Priority Data

Sep. 13, 1984 [DE] Fed. Rep. of Germany ....... 3433622

[51] Int. Cl.$^4$ .............................................. B01D 46/52
[52] U.S. Cl. ........................................ 55/486; 55/498; 55/521
[58] Field of Search .......................... 55/482, 486–489, 55/498, 521; 210/315, 493.2, 493.4, 497.1

[56] References Cited

U.S. PATENT DOCUMENTS

| | | | |
|---|---|---|---|
| 3,186,391 | 6/1965 | Kennedy | 55/482 X |
| 3,187,895 | 6/1965 | Pall et al. | 210/315 X |
| 3,262,563 | 7/1966 | Pall | 210/315 X |
| 3,262,564 | 7/1966 | Pall et al. | 210/315 X |
| 3,283,902 | 11/1966 | Farris et al. | 210/315 X |
| 3,361,260 | 1/1968 | Buckman | 210/315 X |
| 3,370,708 | 2/1968 | Hultgren et al. | 210/315 X |
| 3,397,793 | 8/1968 | MacDonnell | 210/493.5 X |
| 3,420,377 | 1/1969 | Vandersip | 210/315 |
| 3,488,928 | 1/1970 | Tarala | 55/498 X |
| 3,672,130 | 6/1972 | Sullivan et al. | 55/487 X |
| 4,304,580 | 12/1981 | Gehl et al. | 55/482 |
| 4,314,832 | 2/1982 | Fox | 55/482 |

*Primary Examiner*—Robert Spitzer
*Attorney, Agent, or Firm*—Joseph A. Geiger

[57] ABSTRACT

A dual-element disposable filter cartridge for air intake filters of machines operating in a dusty environment, the filter cartridge having a second pleated filter element arranged concentrically inside a first pleated filter element, the filtering paper of the second filter element, in comparison to the filtering paper of the first filter element, having a fractional effective surface area, a lesser density and a heavier gauge with wider and longer flow passages or pores which, due to the higher air flow speed therethrough, trap dust particles which, in the new state of the filter cartridge, pass through the outer filter element.

7 Claims, 2 Drawing Figures

DUAL-ELEMENT FILTER CARTRIDGE FOR AIR INTAKE FILTERS DESIGNED FOR A DUSTY ENVIRONMENT

BACKGROUND OF THE INVENTION

1. Field of the Invention

The present invention relates to air intake filters for internal combustion engines and other air aspirating machines and, more particularly, to a disposable dual-element filter cartridge which is designed for use in air intake filters of air aspirating machines operating in a dusty environment.

2. Description of the Prior Art

Air aspirating machines which have to operate in a dusty environment include, for example, internal combustion machines of commercial vehicles, farm machinery and construction machinery, as well as air compressors and the like. The air intake filters of these machines are expected to have disposable filter cartridges with a large dust accumulation capacity, for a correspondingly long service live, and they have to operate with a good filtering efficiency over the entire duration of their service live.

An additional requirement, common to all air intake filters, is a low flow resistance across the filter. This flow resistance increases gradually, as the layer of accumulated dust on the filter element grows thicker, until it reaches a predetermined critical flow resistance at which the dirty filter cartridge has to be replaced.

For air intake filters of internal combustion engines, the most widely used type of filter cartridge is one which has an annular filter element of pleated filtering paper which is traversed by the air flow in a radially inwardly directed converging air flow. This configuration of the filter element makes is possible to accommodate a relatively large effective filtering surface in a small space.

In filter applications which are designed for a dusty environment, it has become common practice to use filtering papers of between 0.3 and 0.5 mm gauge and a density between 0.2 and 0.3 g/cm$^3$. Normally, the size of the effective filtering surface ranges between 4000 and 5000 cm$^2$ for each m$^3$/min of aspirated air.

This compares to filter applications designed for a dust-free environment, such as, for example, air intake filters of automobile engines—which are assumed to be operated primarily on dust-free roadways—for which an effective filtering surface in the order of 1500 cm$^2$ per m$^3$/min of aspirated air is normally chosen.

In order to accommodate in a given filter cartridge a larger effective surface of filtering paper, it has already been suggested, in U.S. Pat. No. 3,397,793, to use a filter cartridge which has two filter elements of pleated filtering paper arranged in a concentric relationship. However, this particular filter configuration is not suggested for an air intake filter, but for an oil filter which is designed for use in the engine lubrication system of a diesel locomotive. The two filter elements are shown to have the same radial depth, the inner diameter of the outer filter element being approximately twice as large as the inner diameter of the inner filter element.

According to the patent disclosure, this prior art dual-element filter cartridge makes it possible to accommodate in the same space a 25% greater effective filtering area, while offering the additional possibility of selecting a smaller pore size for the inner filter element.

In the case of air intake filters which are designed for use with internal combustion engines operating in a dusty environment, the objective of achieving an acceptable service life makes it desirable to use filtering papers of lesser density, i.e. larger flow passages or pores, in order to delay the plugging up of the pores. However, this result is being achieved at the expense of the filtering efficiency in the new state of the filter cartridge, which is lowered, as more small dust particles are allowed to pass through the larger pores of the filtering paper.

With the passage of operating time, this initially unsatisfactory filtering efficiency improves, as a layer of dust accumulates on the surface of the filter element and the flow passages or pores in the filtering paper become gradually more restricted so as to trap the dust particles which previously passed through the filter element.

It follows that, while all air intake filters are subject to the problem of the countervailing objectives of an extended service life and a satisfactory filtering efficiency in the new state, this problem is more severe in the case of air intake filters which are designed for operation in a dusty environment.

A dual-element filter cartridge of the type suggested for the earlier-mentioned oil filter, where a filter element of fine-pore filtering paper is arranged downstream of a filter element of large-pore filtering paper, would not solve this problem, because the smaller flow passages or pores of the denser filtering paper of the downstream filter element would quickly become plugged up by the dust particles which pass through the larger flow passages or pores in the filtering paper of the upstream filter element, thus actually shortening the service life of the filter cartridge.

U.S. Pat. No. 4,304,580 and the related U.S. Pat. No. 4,314,832 disclose a filter cartridge assembly in which two separate filter cartridges are arranged in a concentric configuration. The inner filter cartridge consists of a filter element of pleated filtering paper of relatively narrow radial width which is enclosed between compression-resistant inner and outer supporting sleeves of perforated sheet metal. The outer filter cartridge is designed as a disposable filter element of pleated filtering paper, having paper, having a much larger radial width than the inner filter cartridge and lacking a supporting member on its inner or outer periphery.

The inner filter cartridge of this known filter assembly serves to counteract the axial clamping pressure generated by the filter housing, while at the same time serving as a backup filter cartridge, in the event that the unprotected principal outer filter cartridge should suffer major structural damage.

Since only the outer cartridge is designed as a disposable filter cartridge which is subject to replacement when caked with accumulated dust, this arrangement does not offer any contribution in terms of a solution to the problem of the air intake filters for dusty environment, where the countervailing objectives of service life and filtering efficiency in the new state have heretofore required an unsatisfactory compromise.

SUMMARY OF THE INVENTION

Underlying the present invention is the primary objective of providing an improved filter cartridge for air intake filters of internal combustion engines and other air aspirating machines operating in a dusty environment, the improvement residing in a better compromise between the objectives of extended service life and high filtering efficiency in the new state of the filter cartridge.

The present invention proposes to attain this objective by suggesting a novel disposable filter cartridge for air intake filters which are used in a dusty environment, which filter cartridge is of the annular type which is traversed by the incoming air in a radially inwardly converging direction, the filter cartridge comprising a first, outer filter element in the shape of a hollow cylindrical body of pleated filtering paper and a second, inner filter element likewise in the shape of a hollow cylindrical body of pleated filtering paper, the two filter elements having the same length and being arranged in a concentric relationship between upper and lower end discs.

The filtering papers of the two filter elements are so coordinated that the effective surface of the inner filter element is a fraction of the effective surface of the outer filter element and, while the filtering papers of the two filter elements are constituted of substantially the same fibers, the filtering paper of the inner filter element has a density which is equal to, or lower than, the density of the filtering paper of the outer filter element and a gauge which is equal to, or heavier than, the gauge of the outer filter element.

In a preferred embodiment of the invention, the effective surface of the inner filter element is equal to between 8 and 24% of the effective surface of the outer filter element, so that the incoming air traverses the filtering paper of the outer filter element at a speed which is between 8 and 24% of the speed at which it traverses the filtering paper of the inner filter element.

Extensive tests have revealed that, surprisingly, the small dust particles which pass through the type of filtering paper which is normally used for filter cartridges of air intake filters of internal combustion engines operating in a dusty environment, prior to the formation of a dust layer on the surface of the filter element, can be trapped with the aid of a second filter element of the stated features which is arranged downstream of the main filter element and which is traversed by the incoming air at a flow speed which is a multiple of the speed at which the air flows through the first filter element.

The explanation for this phenomenon appears to be that the dust particles, after having traversed the filtering paper of the first filter element, become trapped in the comparatively larger and longer passages of the filtering paper of the second filtering element, as a result of the higher speed with which they move through these passages, the dust particles seemingly encountering greater difficulty in negotiating the obstacle course between the fibers of the filtering paper at a greater speed.

Flow speeds above the suggested limits would encounter a flow resistance which, even in the new state of the filter cartridge, would be undesirable and which would become inacceptable, as the resistance increases still further with increasing dirt accumulation on the filter surface.

Excellent levels of filtering efficiency are achievable in accordance with a further suggestion of the present invention which specifies that the density of the filtering paper of the inner filter element be equal to between 70 and 90% of the density of the filtering paper of the outer filter element and the gauge of the filtering paper of the inner filter element be equal to between 100 and 200% of the gauge of the filtering paper of the outer filter element.

A compact structure of the filter cartridge of the invention is obtained by choosing for the inner filter element a radial width which is equal to between 10 and 25% of the radial width of the outer filter element and by selecting for both filter elements approximately the same pleat spacing at the inner element periphery.

In the preferred embodiment of the invention, an air-permeable protective casing encloses the outer filter element, while two supporting sleeves of perforated sheet metal are arranged on the inner and outer sides of the inner filter element to give the filter cartridge the necessary strength against axial compression, when it is clamped between the bottom and cover of a filter housing.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows.

DESCRIPTION OF THE PREFERRED EMBODIMENT

Figure 1:
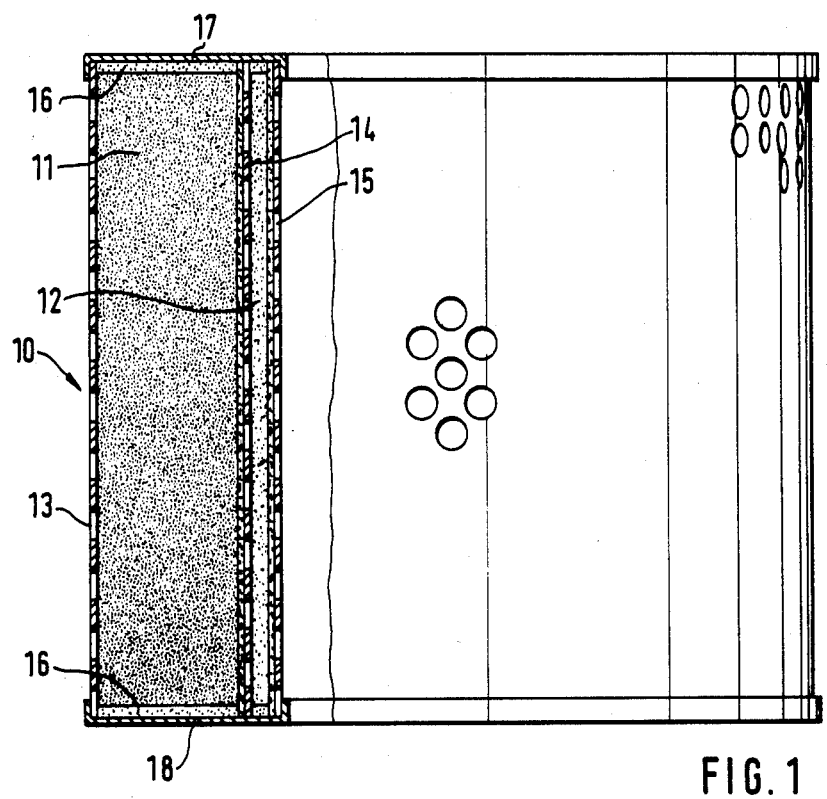
FIG. 1 shows, in an elevational view, a filter cartridge embodying the invention in an elevational view, the filter cartridge being partially sectioned along a longitudinal center plane.

The filter cartridge 10 of the invention comprises a comparatively thick outer filter element 11 and a concentrically arranged comparatively thin inner filter element 12. On its outer periphery, the outer filter element 11 is enclosed by a perforated protective casing 13, and on its inner side it engages an intermediate supporting sleeve 14. The adjacent inner filter element 12 has on its inner periphery a inner supporting sleeve 15.

The two filter elements 11 and 12, the protective casing 13, and the two supporting sleeves 14 and 15 have their aligned end faces attached to upper and lower end discs 17 and 18 by means of an adhesive layer 16 which also serves as an axial seal for the filter cartridge 10.

Figure 2:
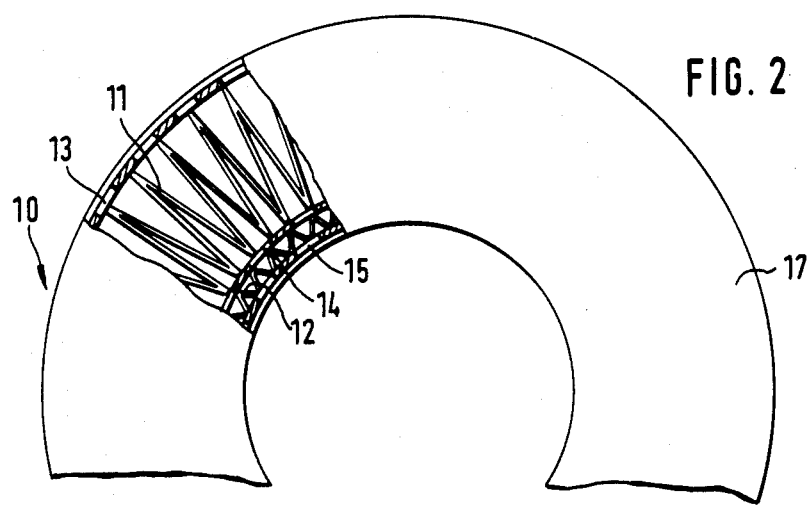
FIG. 2 shows the filter cartridge of FIG. 1 in a plan view, a portion thereof being shown in a transverse cross section.

As can be seen in FIG. 2, the two filter elements 11 and 12 are in the form of hollow cylindrical bodies of pleated filtering paper. The pleats of both filter elements have parallel longitudinal fold lines.

The filtering paper of the outer filter element 11 has preferably a density of 0.25 g/cm$^3$ and a gauge of 0.4 mm. The effective filtering surface of filter element 11 is approximately 4000 cm$^2$ for each cubic meter per minute of air flow. The filtering paper of the inner filter element 12 consists essentially of the same fibers, but at the lesser density only 0.2 g/cm$^3$ and the heavier gauge of 0.6 mm.

The radial depth of the inner filter element 12 is equal to slightly more than 16% of the radial depth of the outer filter element 11. The two filter elements 11 and 12 have preferably the same number of pleats, which means that the effective filtering surface of the inner filter element 12 is equal to slightly more than 16% of the effective filtering surface of the outer filter element 11.

In operation, the incoming raw air flows radially inwardly through the filter cartridge 10, thus passing first through the outer filter element 11 and then through the inner filter element 12. Because the two filter elements 11 and 12 offer to the incoming raw air filtering surfaces of substantially different size, the air must traverse the filtering papers of the two filter element 11 and 12 at correspondingly different flow speeds. Accordingly, the flow speed at which the air traverses the filtering paper of the inner filter element 12 is approximately six times greater than the flow speed at which it traverses the filtering paper of the outer filter element 11.

With a new filter cartridge, this difference in flow speeds through the filtering papers of the two filter elements has the effect of causing air-entrained small dust particles which have passed through the outer filter element 11 to be trapped by the inner filter element 12.

Gradually, as a layer of dust particles accumulates on the filtering paper of the outer filter element 11, its flow passages or pores become more restricted, so that its filtering efficiency improves. It follows that an increasing share of the small dust particles which would pass through the main outer filter element 11 in the new state of the filter cartridge are now being trapped by the filtering paper of the outer filter element 11, so that the special two-stage filtering action of the proposed filter cartridge diminishes correspondingly, as the back-up filtering action of the inner filter element 12 is needed less and less.

It should be understood, of course, that the foregoing disclosure describes only a preferred embodiment of the invention and that it is intended to cover all changes and modifications of this example of the invention which fall within the scope of the appended claims.

I claim the following:

1. A disposable filter cartridge for air intake filters of internal combustion engines and other air aspirating machines operating in a dusty environment, the filter cartridge being of the annular type which is traversed by the air in a radially inwardly converging direction, the filter cartridge comprising in combination:

a first filter element in the shape of a first hollow cylindrical body formed of pleated filtering paper, the pleats of the filtering paper of the first filter element extending parallel and longitudinally with respect to the axis of said first hollow cylindrical body, so as to define concentric inner and outer peripheries of the first filter element;

a second filter element in the shape of a second hollow cylindrical body formed of pleated filtering paper, the pleats of the filtering paper of the second filter element extending parallel and longitudinally with respect to the axis of said second hollow cylindrical body, so as to define concentric inner and outer peripheries of the second filter element, the first and second filter elements having substantially the same axial length, and the second filter element being arranged concentrically inside the first filter element in such a way that the axes of the hollow cylindrical bodies of the two filter elements coincide to define a cartridge axis and the axial extremities of said two filter elements are substantially in radial alignment with each other; and two disc-shaped end members engaging the axial extremities of the first and second filter elements, so as to position said two filter elements in relation to each other and to form impermeable axial end walls for said two filter elements; and wherein;

the filtering papers of said first and second filter elements are constituted of substantially the same fibers;

the density of the filtering paper of the second filter element does not exceed the density of the filtering paper of the first filter element;

the gauge of the filtering paper of the second filter element is not less than the gauge of the filtering paper of the first filter element; and the effective surface of the second filter element is equal to between 8 and 24% of the effective surface of the first filter element, so that the incoming air, flowing through the first and second filter elements in succession, traverses the filtering paper of the first filter element at a speed which is between 8 and 24% of the speed at which it traverses the filtering paper of the second filter element, as a result of which air-entrained particles which, in the new state of the filter cartridge, pass through the first filter element are trapped by the second filter element.

2. A filter cartridge as defined in claim 1, wherein the density of the filtering paper of the second filter element is equal to between 70 and 90% of the density of the filtering paper of the first filter element; and the gauge of the filtering paper of the second filter element is equal to between 100 and 200% of the gauge of the filtering paper of the first filter element.

3. A filter cartridge as defined in claim 1 or claim 2, wherein the radial width of the hollow cylindrical body of the second filter element is equal to between 10 and 25% of the radial width of the hollow cylindrical body of the first filter element.

4. A filter cartridge as defined in claim 3, wherein the filtering papers of the first and second filter elements have pleats of substantially the same spacing at the inner peripheries of the respective filter elements.

5. A filter cartridge as defined in claim 1 or claim 2, further comprising an air-permeable protective casing enclosing the first filter element at its outer periphery;

an intermediate perforated supporting sleeve arranged concentrically between the first and second filter elements; and an inner perforated supporting sleeve arranged at the inner periphery of the second filter element.

6. A dual-element filter cartridge for the air intake filter of an air aspirating machine, the filter cartridge being of the annular type which is traversed by the air in a radially inwardly converging direction, the filter cartridge comprising in combination:

a first filter element in the shape of a first hollow cylindrical body formed of pleated filtering paper, the pleats of the filtering paper of the first filter element extending parallel and longitudinally with respect to the axis of said first hollow cylindrical body, so as to define concentric inner and outer peripheries of the first filter element;

a second filter element in the shape of a second hollow cylindrical body formed of pleated filtering paper, the pleats of the filtering paper of the second filter element extending parallel and longitudinally with respect to the axis of said second hollow cylindrical body, so as to define concentric inner and outer peripheries of the second filter element, the second filter element being arranged concentrically inside the first filter element in such a way that the axes of the hollow cylindrical bodies of the two filter elements coincide to define a cartridge axis; and disc-shaped end members arranged at the axial extremities of the first and second filter elements so as to position the two filter elements in relation to each other and to form impermeable axial end walls for said two filter elements; and wherein;

the filtering papers of the first and second filter elements are constituted primarily of randomly intermingled fibers defining between them flow passages which lead from one side of the filtering paper to the other, the closeness of the fibers to each other representing a measure of the width of said flow passages, and the gauge of the filtering paper representing a measure of the length of said flow passages;

the flow passages of the filtering paper of the second filter element are at least as wide as, and not shorter than, the flow passages of the filtering paper of the first filter element; and the effective surface of the second filter element is equal to a fraction of the effective surface of the first filter element, so that the incoming air, flowing through the first and second filter elements in succession, traverses the filtering paper of the second filter element at a flow speed which is a multiple of the flow speed at which the air traverses the filtering paper of the first filter element, whereby, as a result of the higher flow speed through the flow passages of the filtering paper of the second filter element, air-entrained particles which, in the new state of the filter cartridge, pass through the flow passages of the filtering paper of the first filter element are trapped in the flow passages of the filtering paper of the second filter element.

7. A filter cartridge as defined in claim 6, wherein the flow passages of the filtering paper of the second filter element are wider and longer than the flow passages of the filtering paper of the first filter element.

* * * * *